(12) United States Patent
Preijert et al.

(10) Patent No.: US 11,975,780 B2
(45) Date of Patent: May 7, 2024

(54) VEHICLE STEERING ASSEMBLY

(71) Applicant: Volvo Truck Corporation, Gothenburg (SE)

(72) Inventors: Stefan Preijert, Gothenburg (SE); Jan Zachrisson, Onsala (SE)

(73) Assignee: Volvo Truck Corporation, Gothenburg (SE)

( * ) Notice: Subject to any disclaimer, the term of this patent is extended or adjusted under 35 U.S.C. 154(b) by 7 days.

(21) Appl. No.: 17/911,576

(22) PCT Filed: Mar. 20, 2020

(86) PCT No.: PCT/EP2020/057858
§ 371 (c)(1),
(2) Date: Sep. 14, 2022

(87) PCT Pub. No.: WO2021/185460
PCT Pub. Date: Sep. 23, 2021

(65) Prior Publication Data
US 2023/0110345 A1 Apr. 13, 2023

(51) Int. Cl.
*B62D 7/22* (2006.01)
*B62D 5/00* (2006.01)
(Continued)

(52) U.S. Cl.
CPC ............ *B62D 7/224* (2013.01); *B62D 5/006* (2013.01); *B62D 5/0421* (2013.01); *B62D 6/008* (2013.01)

(58) Field of Classification Search
CPC .... B62D 7/224; B62D 5/0421; B62D 5/0463; B62D 5/001; B62D 6/008
See application file for complete search history.

(56) References Cited

U.S. PATENT DOCUMENTS 3,398,808 A 8/1968 Heckenhauer
5,327,986 A * 7/1994 Saita .................... B62D 5/0463
74/661

(Continued)

FOREIGN PATENT DOCUMENTS

CN 101263040 A 9/2008
CN 104108418 A 10/2014
(Continued)

OTHER PUBLICATIONS

International Search Report and Written Opinion for International Patent Application No. PCT/EP2020/057858, dated Dec. 9, 2020, 13 pages.
(Continued)

*Primary Examiner* — James A English
(74) *Attorney, Agent, or Firm* — Withrow & Terranova, PLLC

(57) ABSTRACT

A vehicle steering assembly comprising an input shaft to be connected to a steering device, a first electric motor connected to the input shaft and arranged to provide a steering device torque and/or a steering device angle, an output shaft connected via a steering linkage to a number of ground engaging members, a rod placed between the input shaft and the output shaft, a first arm rotatably connected to the input shaft and rotatably connected to the rod, and a second arm rotatably connected to the rod and rotatably connected to the output shaft, a second electric motor connected to the output shaft and arranged to provide a steering control torque and/or a steering control angle, wherein the rod comprises a flexible drag link, which in combination with the first and second arm provide for forces in longitudinal direction to be absorbed.

15 Claims, 5 Drawing Sheets

(51) Int. Cl.
  *B62D 5/04* (2006.01)
  *B62D 6/00* (2006.01)

(56) References Cited

U.S. PATENT DOCUMENTS

| | | | |
|---|---|---|---|
| 10,597,068 B2 * | 3/2020 | Steinkogler | F16D 27/108 |
| 2004/0238258 A1 * | 12/2004 | Ono | B62D 1/163 |
| | | | 180/405 |
| 2005/0016791 A1 * | 1/2005 | Fukushima | B62D 6/008 |
| | | | 180/446 |
| 2005/0045413 A1 * | 3/2005 | Shitamitsu | B62D 5/0409 |
| | | | 180/402 |
| 2005/0072621 A1 | 4/2005 | Hara et al. | |
| 2007/0256885 A1 * | 11/2007 | Ammon | B62D 6/008 |
| | | | 180/417 |
| 2014/0012470 A1 * | 1/2014 | Kim | B62D 5/065 |
| | | | 701/42 |
| 2014/0360310 A1 * | 12/2014 | Osonoi | B62D 1/195 |
| | | | 74/496 |
| 2015/0329141 A1 | 11/2015 | Preijert | |
| 2019/0300048 A1 | 10/2019 | Kaufman | |

FOREIGN PATENT DOCUMENTS

| | | |
|---|---|---|
| CN | 106891990 A | 6/2017 |
| CN | 110606120 A | 12/2019 |
| EP | 1826098 A2 | 8/2007 |
| WO | 2008111901 A2 | 9/2008 |
| WO | 2014098655 A1 | 6/2014 |

OTHER PUBLICATIONS

Intention to Grant for European Patent Application No. 20715286.9, dated Oct. 25, 2023, 29 pages.
First Office Action for Chinese Patent Application No. 202080098601.4, mailed Jan. 15, 2024, 18 pages.

* cited by examiner

······ SMT, SCT
—— SDT
— — FMT

······ SCA
—— SDA

......  SMT, SCT
———    SDT
- - -   FMT

......  SCA
———    SDA

VEHICLE STEERING ASSEMBLY

This application is a 35 USC 371 national phase filing of International Application No. PCT/EP2020/057858, filed Mar. 20, 2020, the disclosure of which is incorporated herein by reference in its entirety.

TECHNICAL FIELD

The present disclosure relates to the automotive industry, and in particular to vehicle steering assemblies for trucks or other vehicles.

Although the invention will be described mainly with respect to cargo transport vehicles such as semi-trailer vehicles and trucks, the invention is not restricted to this particular type of vehicle but may also be used in other types of vehicles such as cars.

BACKGROUND

Today, having electric motors as part of a steering assembly for a truck is increasingly popular. The electric motors may be used for providing feedback to a driver via the steering wheel. Feedback via the steering wheel may be used for getting the attention of the driver when the truck is too close or over a lane divider. It could also be used for directing the driver when docking the truck to a loading platform. In addition to providing feedback, the electric motors may also be used for improving steering torque or in any other way strengthen the steering of the vehicle, thereby providing for that less effort is required by the driver as well as that an improved user experience is provided.

An example of the steering assembly can be found in WO2014/098655A1. In addition to using electric motors for providing feedback to the driver, it is also disclosed in this document that a steering force transmitting element can be used such that a first motor connected to an input shaft as well as a second motor connected to an output shaft can be used.

Despite that there are technologies available for providing feedback to the driver and assisted steering via electric motors, there is a need to further improve the technologies to be able to provide even better steering capabilities.

SUMMARY

It is an object of the present disclosure to provide a vehicle steering assembly using electric motors for providing assistance to the driver such that a vehicle using this assembly can be steered in an improved manner.

Generally it has been realized that by having two different electric motors, a first motor connected via an input shaft to a steering device and a second motor connected via an output shaft to a steering linkage, in turn connected to wheels, and a rod having a flexible drag link and connecting the input shaft and the output shaft via a first and a second arm, respectively, longitudinal forces as well as rotational movement can efficiently be compensated for. Having this improved capability to compensate for longitudinal forces and rotational movement provides for that the first and second motor can be run independently to a higher degree, that is, the first motor affects the second motor, and vice versa, to a less degree compared to prior art solutions. Further, reducing an interdependency between the first and second motor also provides for that these can be placed more freely. For example, the second motor may be placed between a steering gear and the steering linkage such that the steering gear is placed between the first and second motor.

The object is achieved by a vehicle steering assembly according to claim 1 as well as by the method according to claim 12.

According to a first aspect it is provided a vehicle steering assembly comprising
  an input shaft configured to be connected to a steering device,
  a first electric motor connected to the input shaft and arranged to provide a steering device torque SDT and/or a steering device angle SDA,
  an output shaft connected via a steering linkage to a number of ground engaging members,
  a rod placed between the input shaft and the output shaft,
  a first arm rotatably connected to the input shaft and rotatably connected to the rod, and
  a second arm rotatably connected to the rod and rotatably connected to the output shaft,
  a second electric motor connected to the output shaft and arranged to provide a steering control torque SCT and/or a steering control angle SCA,
  wherein the rod comprises a flexible drag link, which in combination with the first and second arm provide for that forces in longitudinal direction LD can be absorbed.

The vehicle steering assembly may further comprise
a steering gear connected to the output shaft,
wherein the second electric motor may be placed between the steering gear and the steering linkage.

Having the second motor placed in this way provides for that this may be used efficiently together with the steering gear, thereby achieving an improved steering in terms of that the steering can be adapted to a higher degree and thereby provide an increased steering experience to the driver. For instance, the second electric motor may compensate when the steering gear switches from one gear to another such that the steering can be less effected by such gear switches.

Further, the steering gear and the second electric motor can compensate for different steering disturbances, that is, steering output that are perceived as negative by the driver, e.g. steering wheel vibrations. Having a combination of the two provides thus for that a variety of different disturbances can be compensated for, both static as well as dynamic disturbances.

Using the combination of the second electric motor and the steering gears benefits from having these two placed close to each other. Being placed close provides namely for that conditions for the two are more alike. Having the vehicle assembly arranged as set forth above provides for that the two can be placed close.

The first electric motor may be placed between the steering gear and the second electric motor.

Having both the first and second electric motor placed between the steering gear and the steering linkage provides for that the three may be used in combination for achieving an improved steering precision.

The vehicle assembly may further comprise a control device communicatively connected to the first and second electric motor and configured to control the steering device angle SDA and/or the steering device torque SDT via the first electric motor and the steering control angle SCA and/or the steering control torque SCT via the second electric motor.

By using the control device and having this communicatively connected to the first and second electric motor provides for that these can be optimized from an overall perspective, that is, instead of controlling each motor individually these can be controlled in a joint manner. An advantage of this is that a more precise steering can be achieved.

The vehicle assembly may further comprise an input shaft sensor arrangement configured to determine the steering device angle SDA and/or the steering device torque SDT of the input shaft and communicatively connected to the control device, and an output shaft sensor arrangement configured to determine the steering control angle SCA and/or the steering control torque SCT of the output shaft and communicatively connected to the control device.

Having these two sensor arrangements and having these communicatively connected to the control device provides for that more input data can be provided to the control device, which can result in that the steering can have a lower response time and also that a risk of steering errors can be even further reduced.

The second arm may be L-shaped and in a first end rotatably connected to the rod, in a second end rotatably connected to the steering linkage, and in a mid-portion connected to the second electric motor.

By having the second arm arranged in this manner this may both be used for compensating longitudinal forces at the same time as forming part of the steering linkage. Having the first end rotatably connected to the rod provides for that steering input from the steering device and the first electric motor may be provided via this part of the second arm. Having the mid-portion connected to the second electric motor provides for that steering input from this motor may be provided via the mid-section.

The steering linkage may comprise a first and a second drag link and an axle beam, wherein the second end of the second arm may be rotatably connected to the first and second drag links, and the second electronic motor may be connected to the axle beam.

The vehicle steering assembly may further comprise a hydraulic device configured to provide the steering control torque SCT and/or the steering control angle SCA together with the second motor.

An advantage of having the hydraulic device is that this in combination with the second electric motor can improve the steering capabilities.

The control device may be configured to provide force feedback via the steering device by using the first electric motor.

An advantage with using the first electric motor for providing force feedback is that the second electric motor can be used for strengthening the steering at the same time. Having the rod provides for that the first and second electric motor can be handled independently to a higher degree compared to a steering assembly without the rod.

A maximum power output of the first electric motor may be less than a maximum power output of the second electric motor.

Generally, less power output is needed for providing feedback to the driver than for strengthening the steering via the steering linkage. Having two electric motors and having the possibility to run this independently to a high degree, as explained above, provides for that a smaller electric motor may be chosen as the first electric motor while a larger electric motor may be chosen as the second electric motor.

The first electric motor may have a first axis of rotation AR1, the second electric motor may have a second axis of rotation AR2, the first arm may have a third axis of rotation AR3 in a first connection point CP1 connecting the first arm with the input shaft, and a fourth axis of rotation AR4 in a second connection point CP2 connecting the first arm 116 with the rod, the second arm may have a fifth axis of rotation AR5 in a third connection point CP3 connecting the second arm with the rod and a sixth axis of rotation AR6 in a fourth connection point CP4 connecting the second arm with the output shaft, wherein the first axis of rotation AR1 and the third axis of rotation AR3 are non-parallel.

According to a second aspect it is provided a method for controlling a vehicle steering assembly comprising an input shaft, an output shaft connected to a steering linkage, a rod comprising a flexible drag link, a first arm connecting the input shaft with the rod, a second arm connecting the rod with the output shaft, a first electric motor connected to the input shaft, a second electric motor connected to the output shaft, the method comprising providing a steering device angle SDA and/or a steering device torque SDT via the input shaft using the first electric motor, providing a steering control angle SCA and/or steering control torque SCT via the output shaft using the second electric motor, and compensating for forces in longitudinal direction LD using the rod comprising the flexible drag link in combination with the first and second arm.

The vehicle steering assembly may comprise a steering gear connected to the output shaft, wherein the second electric motor is placed between the steering gear and the steering linkage.

The second arm may be L-shaped and in a first end rotatably connected to the rod, in a second end rotatably connected to the steering linkage, and in a mid-portion connected to the second electric motor.

The steering linkage may comprise a first and a second drag link and an axle beam, wherein the second end of the second arm may be rotatably connected to the first and second drag links, and the second electronic motor may be connected to the axle beam.

The vehicle steering assembly may further comprise a control device communicatively connected to the first and second electric motor.

According to a third aspect it is provided a control device for controlling a vehicle assembly, the control device being configured to perform the steps of the method according to the second aspect.

The same advantages and features presented with reference to the first aspect are also applicable to the other aspects unless explicitly stated otherwise.

The term "steering device" should be construed broadly. It may be a steering wheel as we know today, i.e. a ring-shaped device connected to a steering column, but it may also be in the form of a joystick, lever, or other non-ring-shaped device used by the driver for steering the truck, or more generally the vehicle.

The term "flexible drag link" should be interpreted broadly as a device that can provide for that the rod is extended or reduced in a longitudinal direction. The flexible drag link is thus not to be seen as a specific type of technical device.

There is also disclosed herein control units, computer programs, computer readable media, computer program products, brake systems and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
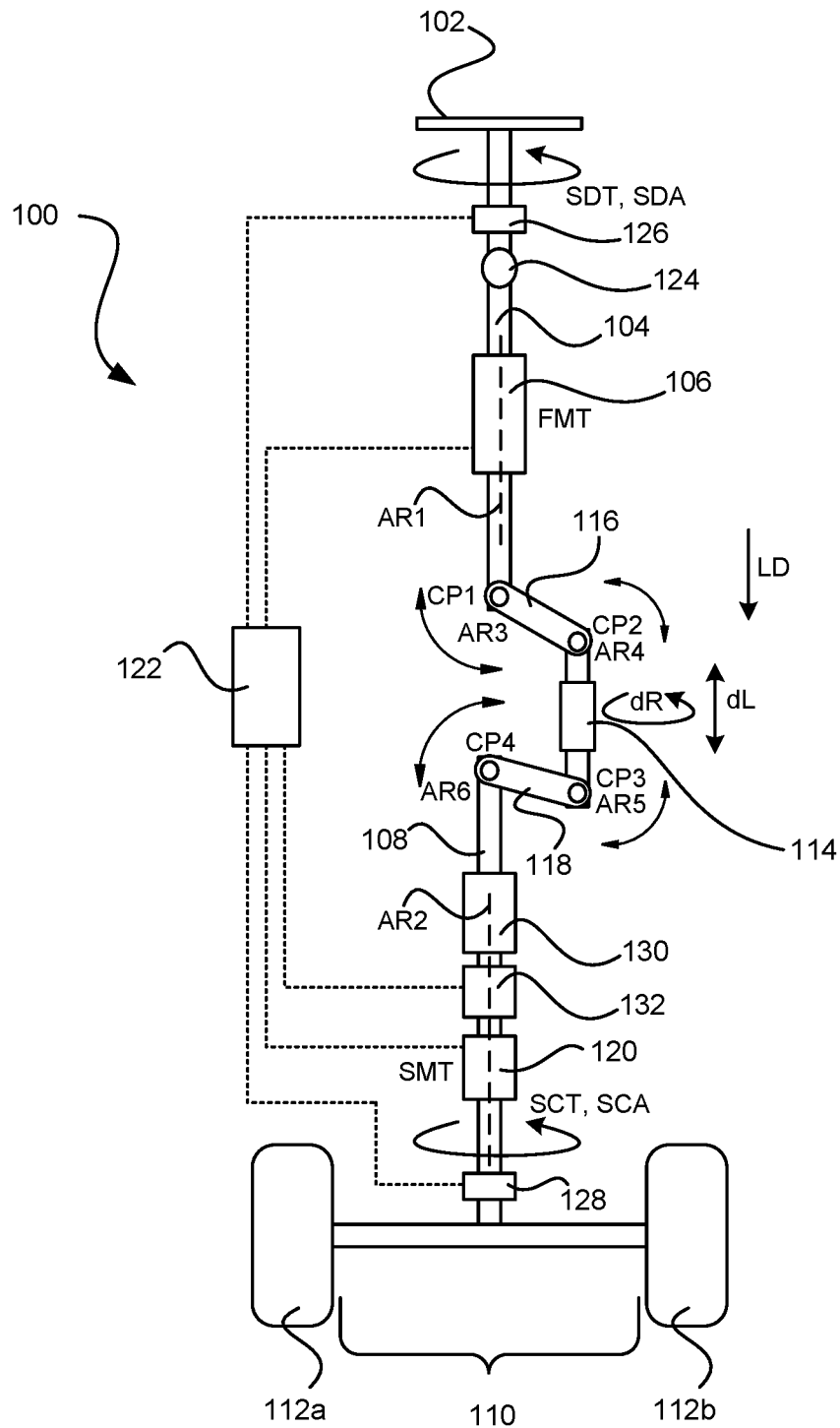
FIG. 1 generally illustrates a vehicle steering assembly.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates a vehicle steering assembly 100 by way of example. Interaction between the steering assembly 100 and a driver may take place via a steering device 102. This may be connected via an input shaft 104 which in turn is connected to a first electric motor 106. The first electric motor 106 can be adapted to provide feedback to the driver via the steering device 102 and the input shaft 104. More particularly, a first motor torque FMT provided by the first electric motor 106 may affect a steering device angle SDA and/or a steering device torque SDT. For example, the feedback may be provided by that the SDA is rapidly changing or fluctuating, e.g. the steering device is vibrating, when attention of the driver is needed.

An output shaft 108 can be connected to a steering linkage 110, which may comprise an axle beam and steering arms. The steering linkage 110 can in turn be connected to ground engaging members 112a, 112b, such as wheels, providing for that a movement of the steering linkage 110 can be translated into movement of the ground engaging members 112a, 112b.

The input shaft 104 and the output shaft 108 are connected to each other via a rod 114 provided with a flexible drag link. This flexible drag link provides for that longitudinal forces formed by that the input shaft 104 and the output shaft 108 are moved relative to each other can be compensated for. As illustrated, the rod 114 can be connected to the input shaft 104 via a first arm 116 and to the output shaft 108 via a second arm 118. The first arm 116 can be rotatably attached to the input shaft 104 in a first connection point CP1 and to the rod 114 in a second connection point CP2. In a similar manner, the second arm 118 can be rotatably attached to the rod 114 in a third connection point CP3 and to the output shaft 108 in a fourth connection point CP4. Due to that the first and second arm 116, 118 are rotatably attached, several axes of rotations are provided. More particularly, the input shaft 104 can rotate along a first axis of rotation AR1, translating into turning of the steering device 102, the output shaft 108 can rotate along a second axis of rotation AR2. Further, the CP1 can rotate along a third axis of rotation AR3, the CP2 can rotate along a fourth axis of rotation AR4, the CP3 can rotate along a fifth axis of rotation AR2, and the CP4 can rotate along a sixth axis of rotation AR6. An advantage of having this set up is that a rotational difference dR can be compensated for, and also that a longitudinal difference dL can be compensated for. The longitudinal difference dL can also be compensated for by the flexible draglink of the rod 114, which also may be referred to as a link rod.

A second motor 120 may be connected to the output shaft 108 such that a steering control torque SCT and/or a steering control angle SCA can be affected by that a rotation of the output shaft 108 provided via the second arm 118 is strengthened or reduced by a second motor torque SMT provided via the second electric motor 120.

Instructions on how to run the first and/or the second motor 106, 120 may be provided by control signals transmitted from a control device 122. Transmission of the signals may be wireless or via wire or a combination thereof. Even though not illustrated, software updates or similar may be provided to the control device 122 from a remote server. Further, data sent and/or received by the control device 122 may be uploaded to the remote server for e.g. analysis purposes.

A joint 124 may be used for providing more flexibility in terms of how the steering device 102 is placed in relation to the steering linkage 110 and how the input shaft 104 and output shaft 108 are placed. As illustrated, the joint 124 may placed on the input shaft 104, but it is equally possible to have one or several joints placed on the output shaft 108 as well as several joints placed on the input shaft 104.

In addition, an input shaft sensor arrangement 126 may be provided such that a position of the input shaft 104 can be determined. The input shaft sensor arrangement 126 may comprise a number of different sensor or only one sensor. Further, different types of sensors can be used for determining the position, e.g. a rotary potentiometer and/or a hall-effect sensor. Position data may be transmitted from the input shaft sensor arrangement 126 to the control device 122 and used as input for determining the control signals.

In a similar manner, an output shaft sensor arrangement 128 may be provided such that a position of the output shaft 108 can be determined. As for the input shaft sensor arrangement 126, the output shaft sensor arrangement 128 may comprise one or several sensors and different types of sensors. Position data captured by the output shaft sensor arrangement 128 may be used as input for determining the control signals.

The steering assembly 100 may further comprise a steering gear 130. As illustrated, the steering gear 130 may be placed between the rod 114 and the second electric motor 120, thereby providing for that the first and second electric motor 106, 120 can compensate for longitudinal differences dL and rotational differences dR caused by the steering gear 130 without affecting output to the driver via the steering device 120 and output to the steering linkage 110. As illustrated, the steering gear 130 may receive or transmit data to the control device 122. An advantage with this can be that gear changes can be synchronized with torque changes in the first and/or second electric motor 106, 120. Since the second motor 120 can be used for strengthening the SCT and the SCA, this motor may be used in combination with the steering gear 130 as illustrated or replacing the steering gear 130.

By placing the steering gear 130 close to the second electric motor 120, similar conditions for the two can be achieved. This is beneficial since the two are used in combination for reducing different types of steering disturbances such that an improved overall steering experience may be achieved. The combination of the two may for instance be used for efficiently reducing static as well as dynamic disturbances. Having this combination also provides for increased flexibility in terms of user-adjustability, i.e. increased possibilities to adjust according to personal preferences.

To improve the steering experience, GPS data in combination with a database with position-related steering data may also be used. For instance, a position of the vehicle, determined by the GPS data or similar type of data, may be used for retrieving position-related steering data from a database arranged on-board the vehicle or at a remote server accessible via, e.g., wireless data link. The position-related steering data can be pre-determined and provides information about a road condition ahead for the determined position of the vehicle. Having information about the road ahead provides for that a more responsive steering experience can be achieved and that steering disturbances can be prevented further. Thus, for instance, by combining the steering gear, the second electric motor and the position-related steering data, the steering disturbances can be prevented or at least alleviated efficiently.

Further, the vehicle steering assembly 100 can further comprise a hydraulic device 132. As illustrated, the hydraulic device 132 can be connected to the output shaft 108 such that the SCT and the SCA may be affected. The hydraulic device 132 may be communicatively connected to the control device 122. The hydraulic device 132 may be used as a complement to the second electric motor 120 such that when extra effect is needed the hydraulic device 132 may be activated to assist the second electric motor 120.

Figure 2:
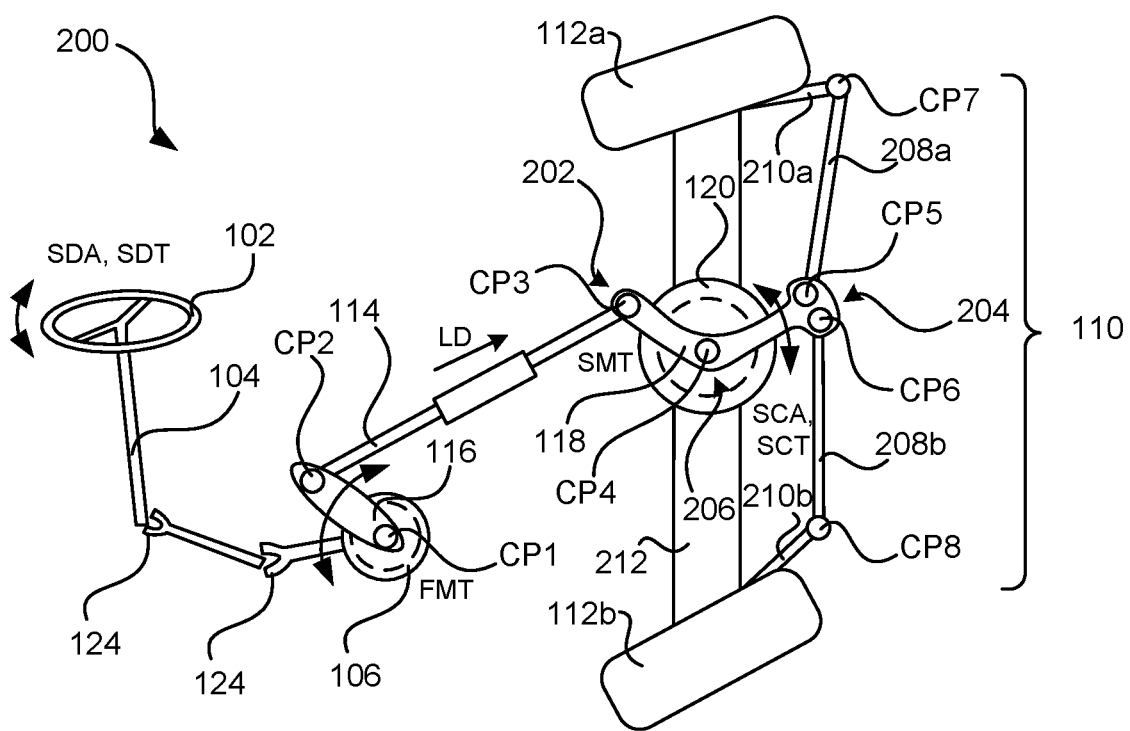
FIG. 2 illustrates an embodiment of the vehicle steering assembly.

FIG. 2 illustrates by way of example a steering assembly 200 that is an embodiment of the principle illustrated in FIG. 1. For illustrative purposes, elements not directly contributing to steering have been left out.

As illustrated, unlike in FIG. 1, the second arm 118 is L-shaped. By having the steering assembly 200 embodied in this way, the second arm 118 can be closely connected to the steering linkage 110. More particularly, a first end 202 can be rotatably connected to the rod 114 in the connection point CP3 and a second end 204 can be rotatably connected to the steering linkage 110. A mid-portion 206 of the second arm 118 can be connected to the second electric motor 120 such that second arm 118 can be controlled using this motor. As illustrated, the second end 204 may be connected to the steering linkage 110 by that this end is rotatably connected in a fifth and sixth connection point CP5, CP6 to a first and second drag link 208a, 208b, respectively. These drag links may in turn be rotatably connected to a first and second steering arm 210a, 210b connected to the ground engaging members 112a, 112b, respectively, such that movement of the second arm 118 can be translated into movement of the ground engaging members 112a, 112b. The drag links 208a, 208b may be connected to the steering arms 210a, 210b in a seventh connection point CP7 and an eighth connection point CP8, respectively. In addition to being linked to the steering arms 210a, 210b, the ground engaging members 112a, 112b may also be connected to an axle beam 212, thereby providing for that the ground engaging members 112a, 112b can be controlled as well as being securely attached to the steering assembly 200. As illustrated, the second motor 120 may be attached to the axle beam 212. One option is to have this directly attached to the axle beam 212. Another option is to have it indirectly attached via another element. Both options are equally possible as long as the second electric motor 120 can provide for that the steering arms 210a, 210b can be moved relative the axle beam 212, thereby providing for that the ground engaging members 112a, 112b are moved relative to the axle beam 212 and other ground engaging members (not illustrated) of the vehicle such that steering of the vehicle can be achieved.

Figure 3:
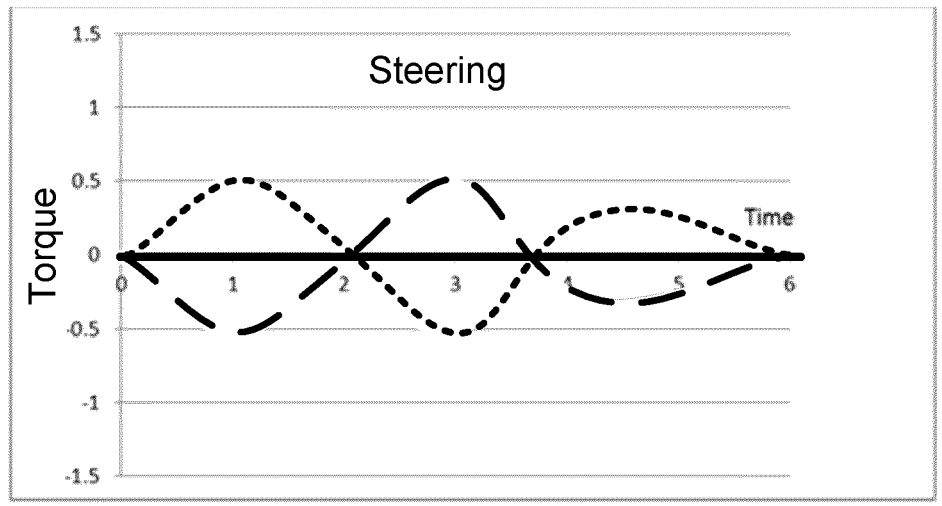
FIG. 3-4 illustrates an example on how a dynamic steering error can be compensated for, FIG. 5-6 illustrates an example on how a static steering error can be compensated for, and FIG. 7 is a flowchart illustrating a method for controlling the steering device assembly.
Figure 4:
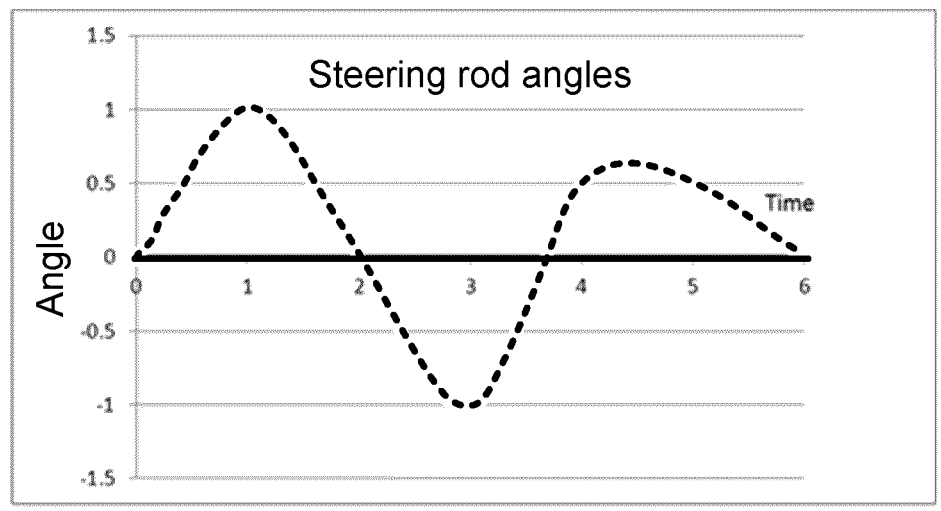

FIGS. 3 and 4 illustrate by way of example how a dynamic steering error can be compensated for. An effect of dynamic steering errors is that the steering control torque SCT as well as the second motor torque SMT vary over time. To compensate for this and to provide for that this torque is not affecting the driver's experience, the first motor torque FMT may counteract the torque of the second motor torque SMT and the steering control torque SCT. An effect of this counteraction is that the steering device torque SDT is non-existing, i.e. zero torque. The same dynamic steering errors from the perspective of steering rod angles are illustrated in FIG. 4. As illustrated, despite there being a fluctuation in the steering control angle SCA this will not affect the steering device angle SDA.

Figure 5:
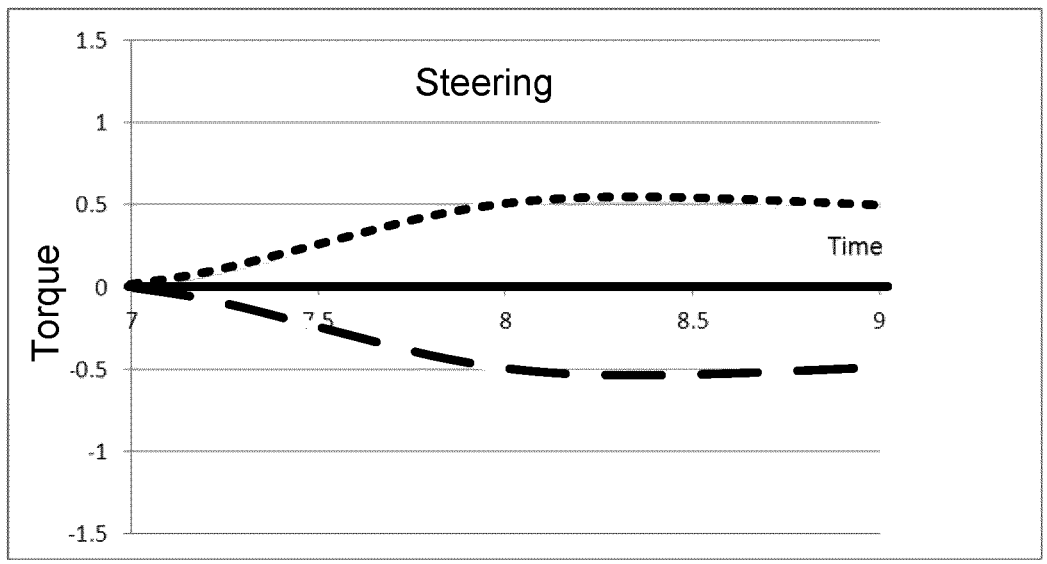
Figure 6:
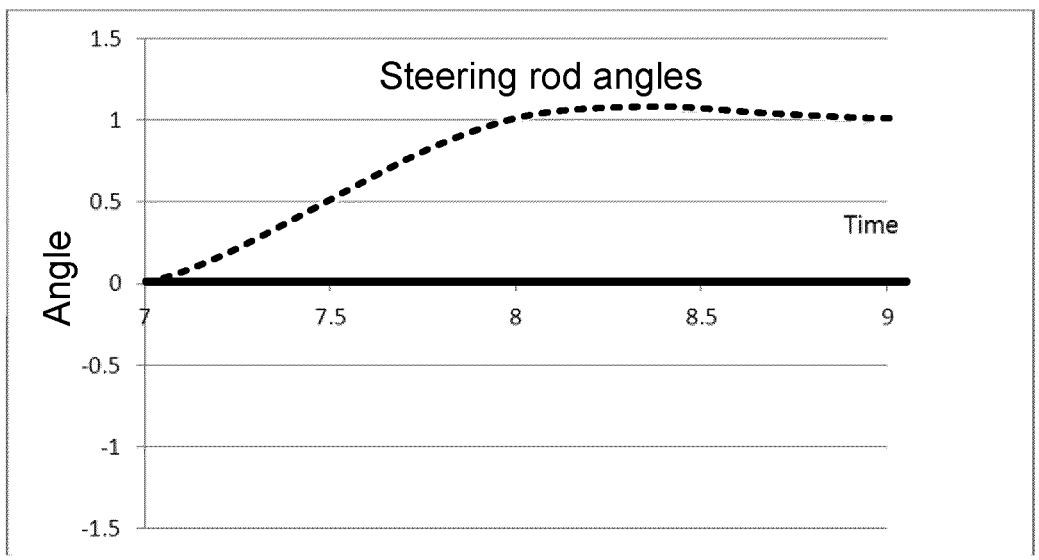

FIGS. 5 and 6 illustrate by way of example how a static steering error can be compensated for. Unlike the dynamic errors illustrated in FIGS. 3 and 4, the static error illustrated in FIGS. 5 and 6 does not vary over time in the same manner. However, as is the case in FIGS. 3 and 4, the first motor torque FMT, i.e. the first motor 106 connected to the input shaft 104, can be used to counter-act the steering control torque SCT as well as the second motor torque SMT such that this static error is not forwarded to the driver, which as an effect provides for an improved user experience for the driver.

Figure 7:
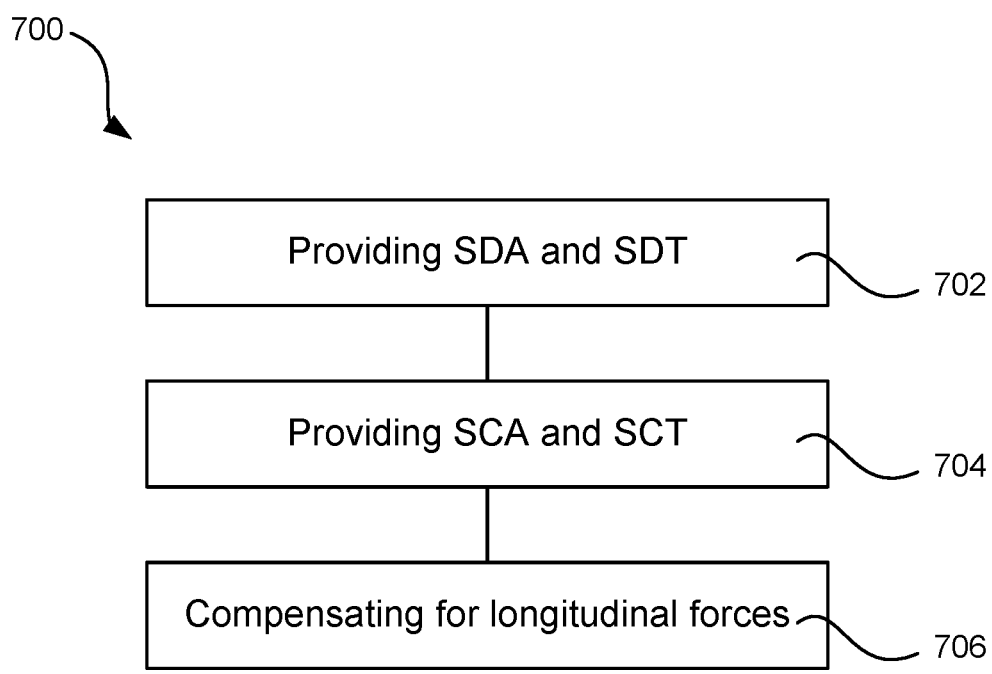

FIG. 7 is a flowchart illustrating a method 700 for controlling the vehicle steering assembly 100, 200. The method comprises three main steps; a first step 720 in the steering device angle SDA and the steering device torque SDT is provided, a second step 704 in which the steering control angle SCA and the steering control torque SCT is provided, and a third step 706 in which the longitudinal forces are compensated for by using the rod 114 comprising the flexible drag link in combination with the first and second arm 116, 118.

As explained above, in addition to compensating for the longitudinal forces by expanding or reducing the flexible drag link, i.e. compensating for the longitudinal difference dL, the rotational difference dR may also be compensated for by the rod 114 in combination with the first and second arm 116, 118.

From the description above follows that, although various embodiments of the invention have been described and shown, the invention is not restricted thereto, but may also be embodied in other ways within the scope of the subject-matter defined in the following claims.

The invention claimed is:

1. A vehicle steering assembly comprising:
   an input shaft configured to be connected to a steering device,
   a first electric motor connected to the input shaft and arranged to provide a steering device torque and/or a steering device angle,
   an output shaft connected via a steering linkage to a number of ground engaging members,
   a rod placed between the input shaft and the output shaft,
   a first arm rotatably connected to the input shaft and rotatably connected to the rod,
   a second arm rotatably connected to the rod and rotatably connected to the output shaft, and
   a second electric motor connected to the output shaft and arranged to provide a steering control torque and/or a steering control angle,
   wherein the rod comprises a flexible drag link, which in combination with the first and the second arm provide for forces in longitudinal direction to be absorbed; and
   further comprising a steering gear connected to the output shaft;
   wherein the second electric motor is placed between the steering gear and the steering linkage.

2. The vehicle steering assembly of claim 1, wherein the first electric motor is placed between the steering gear and the second electric motor.

3. The vehicle assembly of claim 1, further comprising:
   a control device communicatively connected to the first and the second electric motor and configured to control the steering device angle and/or the steering device torque via the first electric motor and the steering control angle and/or the steering control torque via the second electric motor.

4. The vehicle assembly of claim 1, further comprising:
   an input shaft sensor arrangement configured to determine the steering device angle and/or the steering device torque of the input shaft and communicatively connected to the control device, and
   an output shaft sensor arrangement configured to determine the steering control angle and/or the steering control torque of the output shaft and communicatively connected to the control device.

5. The vehicle steering assembly of claim 1, wherein the second arm is L-shaped and in a first end rotatably connected to the rod, in a second end rotatably connected to the steering linkage, and in a mid-portion connected to the second electric motor.

6. The vehicle steering assembly of claim 5, wherein the steering linkage comprises a first and a second drag link and an axle beam, wherein the second end of the second arm is rotatably connected to the first and the second drag links, and the second electronic motor is connected to the axle beam.

7. The vehicle steering assembly of claim 1, further comprising:
   a hydraulic device configured to provide the steering control torque and/or the steering control angle together with the second motor.

8. The vehicle steering assembly of claim 1, wherein the control device is configured to provide force feedback via the steering device by using the first electric motor.

9. The vehicle steering assembly of claim 1, wherein a maximum power output of the first electric motor is less than a maximum power output of the second electric motor.

10. The vehicle steering assembly of claim 1, wherein the first electric motor has a first axis of rotation, the second electric motor has a second axis of rotation, the first arm has a third axis of rotation in a first connection point connecting the first arm with the input shaft and a fourth axis of rotation in a second connection point connecting the first arm with the rod, and the second arm has a fifth axis of rotation in a third connection point connecting the second arm with the rod and a sixth axis of rotation in a fourth connection point connecting the second arm with the output shaft,
    wherein the first axis of rotation and the third axis of rotation are non-parallel.

11. A method for controlling a vehicle steering assembly, the vehicle steering assembly comprising:
    an input shaft,
    an output shaft connected to a steering linkage,
    a rod comprising a flexible drag link,
    a first arm connecting the input shaft with the rod,
    a second arm connecting the rod with the output shaft,
    a first electric motor connected to the input shaft, and
    a second electric motor connected to the output shaft,
    the method comprising:
       providing a steering device angle and/or a steering device torque via the input shaft using the first electric motor,
       providing a steering control angle and/or a steering control torque via the output shaft using the second electric motor, and compensating for forces in longitudinal direction using the rod comprising the flexible drag link in combination with the first and the second arm;
    wherein the vehicle steering assembly further comprises a steering gear connected to the output shaft; and
    wherein the second electric motor is placed between the steering gear and the steering linkage.

12. The method of claim 11, wherein the second arm is L-shaped and in a first end rotatably connected to the rod, in a second end rotatably connected to the steering linkage, and in a mid-portion connected to the second electric motor.

13. The method of claim 11, wherein the steering linkage comprises a first and a second drag link and an axle beam, wherein the second end of the second arm is rotatably connected to the first and second drag links, and the second electronic motor is connected to the axle beam.

14. The method of claim 11, further comprising:
    a control device communicatively connected to the first and the second electric motor.

15. A control device for controlling a vehicle assembly, the control device being configured to perform the steps of the method of claim 11.

* * * * *